Feb. 7, 1933.  G. LAMBERT  1,896,587
LOADING MECHANISM
Filed May 6, 1931   4 Sheets-Sheet 4
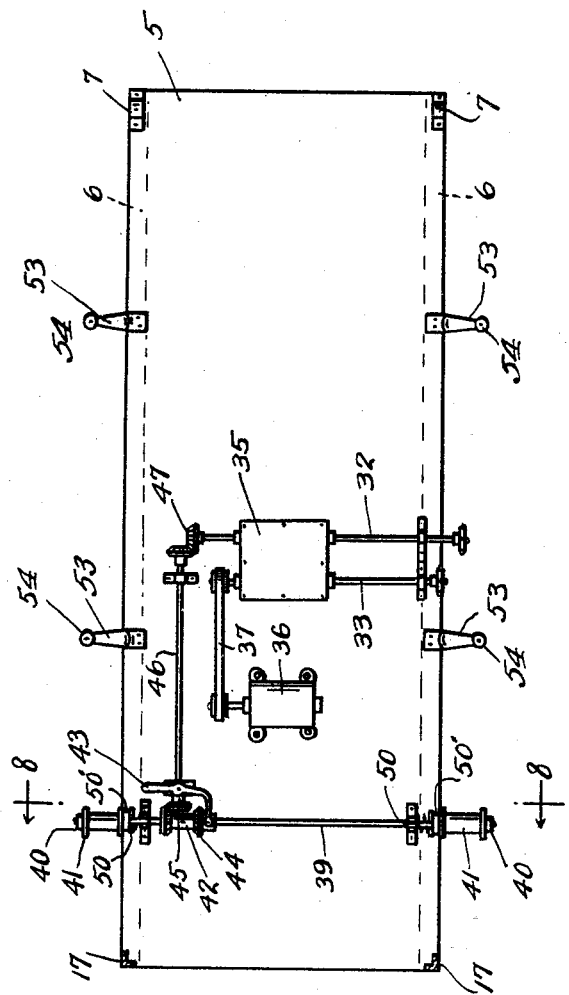
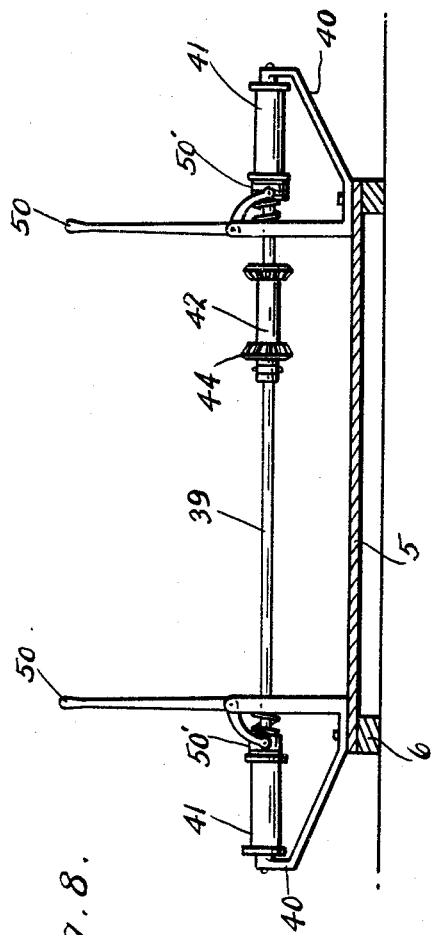
Fig.7.
Fig.8.
Inventor
Garrett Lambert
By Clarence A. O'Brien
Attorney Patented Feb. 7, 1933

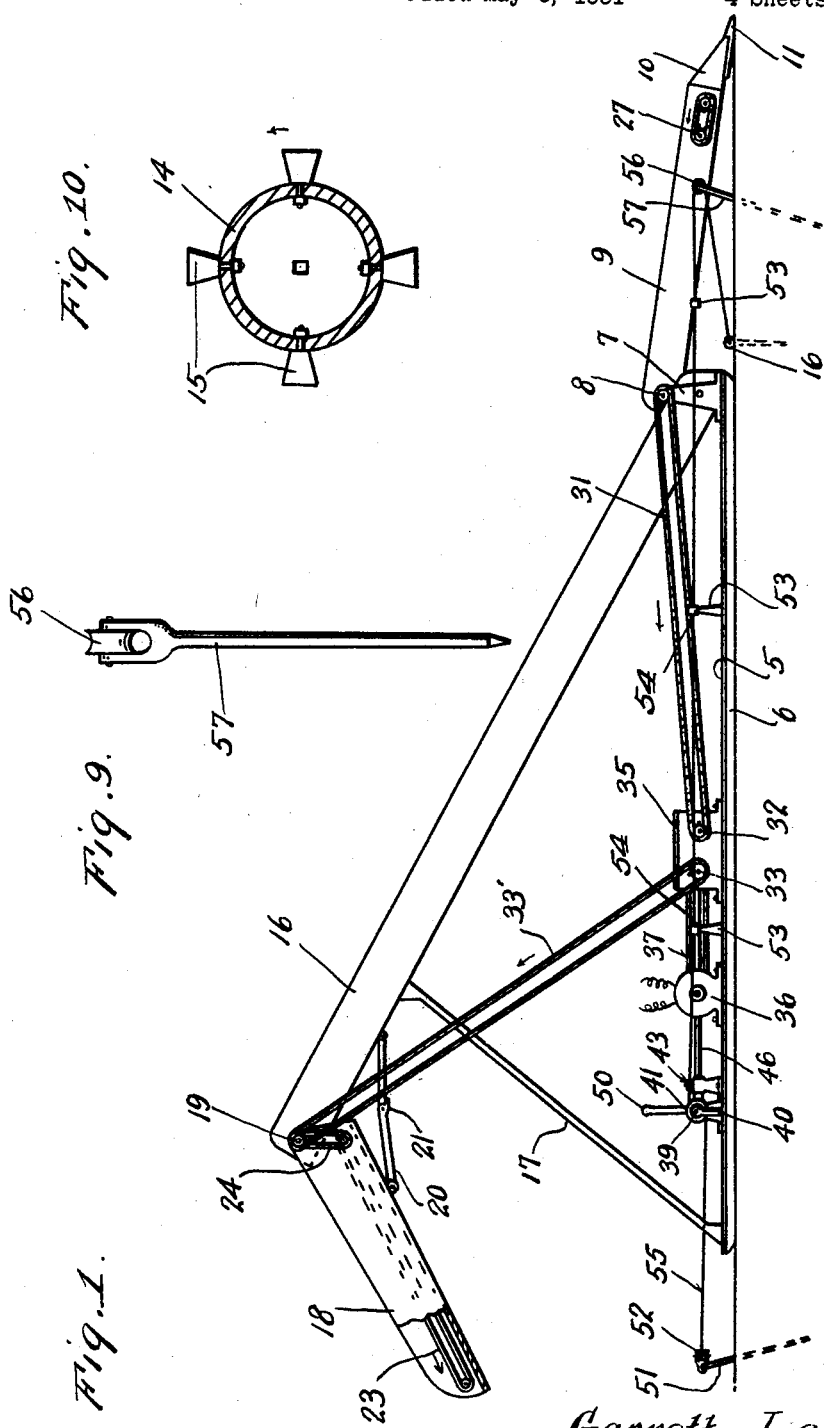

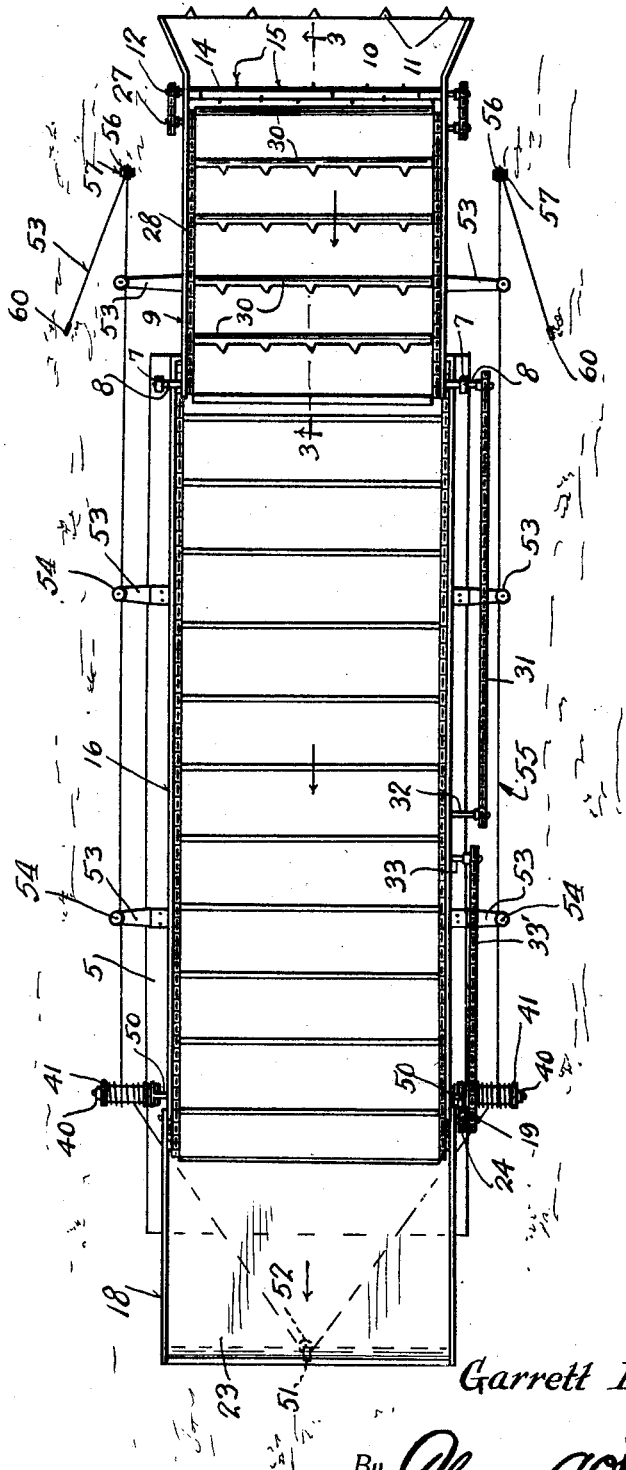

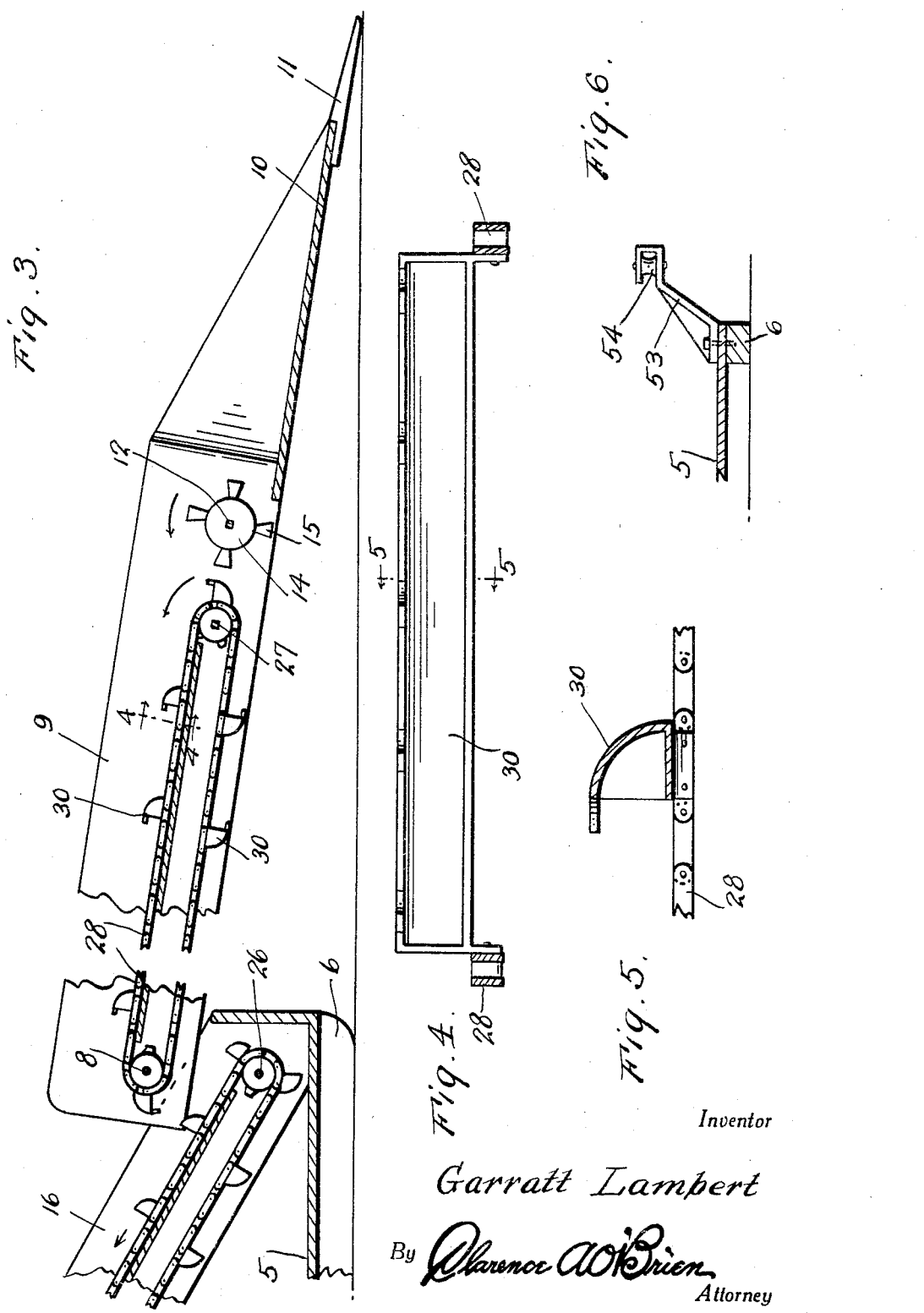

1,896,587

UNITED STATES PATENT OFFICE

GARRETT LAMBERT, OF ROCK SPRINGS, WYOMING, ASSIGNOR OF FORTY PER CENT TO TONY RADALJ

LOADING MECHANISM

Application filed May 6, 1931. Serial No. 535,459.

The present invention relates to a loading apparatus for use in loading coal and the like and has for its prime object to provide an apparatus of this nature which is comparatively simple in construction, strong and durable, easy to manipulate, thoroughly efficient and reliable in use and operation, compact and convenient in its arrangement of parts, and otherwise well adapted to the purpose for which it is designed.

With the above and numerous other objects in view as will appear as the description proceeds, the invention resides in certain novel features of construction, and in the combination and arrangement of parts as will be hereinafter more fully described and claimed.

In the drawings:

Figure 1 is a side elevation of an apparatus embodying the features of my invention.

Figure 2 is a top plan view thereof.

Figure 3 is a vertical longitudinal section therethrough taken substantially on the line 3—3 of Figure 2.

Figure 4 is a detail sectional view through a pair of the chains showing a bucket mounted thereon.

Figure 5 is a detail vertical section taken substantially on the line 5—5 of Figure 4.

Figure 6 is a detail section through the platform showing one of the guide brackets.

Figure 7 is a top plan view of the platform.

Figure 8 is a vertical transverse section therethrough taken substantially on the line 8—8 of Figure 7.

Figure 9 is a detail elevation of one of the pegs, and

Figure 10 is a transverse section through the beader.

Referring to the drawings in detail it will be seen that the numeral 5 denotes a platform mounted on longitudinal runners 6. Brackets 7 rise from the forward corners of the platform 5 and have journalled therein a shaft 8 on which is rockable the rear end of a frame 9 which inclines downwardly and forwardly and the forward end thereof has a platform with tines or teeth 11 projecting forwardly therefrom. A shaft 12 is journalled across the frame 9 immediately to the rear of the platform 10 and has a beader 14 thereon in the form of a drum with radial projections 15. A frame 16 inclines upwardly and rearwardly from the forward end of the platform 5 and the bottom rear corners of the frame 9 extend into the lower end thereof. The rear end of the frame 16 is supported by props 17 which incline upwardly and forwardly from the rear end of the platform 5. A frame 18 is rockable on a shaft 19 at the upper end of the frame 16 to incline downwardly and rearwardly therefrom and to be held in position by means of braces 20 which are formed in sections pivoted together as at 21.

An endless belt mechanism 23 is mounted in the frame 18 and is operatively connected with the shaft 19 by a chain and sprocket mechanism 24. A shaft 26 is journalled across the front end of the frame 6 and intermediate portions of the brackets 7. A shaft 27 is journalled across the frame 9 immediately to the rear of the shaft 12. Chain and sprocket mechanisms 28 are associated with the shafts 8 and 27 and the shafts 19 and 26. These chains have elongated buckets 30 fixed transversely thereof. A chain and sprocket mechanism 31 drives the shaft 8 from a shaft 32. A chain and sprocket mechanism 33 drives the shaft 19 from a shaft 33. The shafts 32 and 33 are operatively connected with a transmission mechanism 35 on the platform 5. The transmission mechanism is operatively connected with a motor 36 by a belt and pulley mechanism 37.

A shaft 39 is journalled in brackets 40. Windlasses 41 are mounted on the ends of the shaft 39. A sleeve 42 is splined on the shaft 39 and shiftable by a lever 43 so as to mesh pinions 44 on its ends with a pinion 45 on a shaft 46 which is connected with the transmission mechanism through gearing 47. Thus the shaft 39 may be rotated in either direction or may be in neutral or non-rotating position by proper manipulation of lever 43. Windlasses 41 have clutch mechanisms 50' associated therewith and said windlasses and clutch mechanisms are arranged on the shaft 39 and are controlled by a lever 50.

A peg 51 is driven in the ground to the rear of the platform and has a pulley 52. An intermediate portion of the cable 55 is trained thereover, wound partially about the windlasses 41 extended forwardly in guide pulleys 54 on brackets 53 at the sides of the platform and then trained over pulleys 56 in the pegs 57 driven in the ground forwardly of the platform and then anchored to pegs 60 driven in the ground in front of the platform but rearwardly of the pegs 57. Obviously by proper manipulation of the levers 50 and the lever 43 the platform may be moved forwardly or rearwardly in order to bring the teeth or tines 11 into proper engagement with a pile of coal or the like and cause it to be deposited on the platform 10 and to be thrown by the beader on to the endless bucket conveyor of the frame 9 and from there deposited in the endless bucket conveyor of the frame 16 and from there deposited into the frame 18 so as to be loaded in a wagon, or the like.

It is thought that the construction, operation, utility and advantages of this invention will now be quite apparent to those skilled in this art without a more detailed description thereof.

The present embodiment of the invention has been described in considerable detail merely for the purposes of exemplification since in actual practice it attains the features of advantage enumerated as desirable in the statement of the invention and the above description.

It will be apparent that changes in the details of construction, and in the combination and arrangement of parts may be resorted to without departing from the spirit or scope of the invention as hereinafter claimed or sacrificing any of its advantages.

Having thus described my invention, what I claim as new is:

A loading apparatus of the class described comprising a platform, runners attached to the bottom of the platform, a pair of uprights connected with the front end of the platform, a conveyor frame, a shaft passing through the rear end of the frame and having its ends journalled in the upper ends of the uprights, said conveyor frame having the front ends of its side portions flaring outwardly and the upper edges of said flaring portions sloping downwardly and forwardly, a bottom forming member connected with the lower edges of the flaring portions, teeth having their rear portions connected to the front edge of said bottom forming member with the front ends of the teeth adapted to rest upon a surface for supporting the conveyor frame in a position sloping downwardly and forwardly at the front end of the platform, an endless conveyor in the frame passing over the shaft, a beader located in the conveyor frame in front of the front end of the conveyor for engaging the material passing over the bottom forming member, a second shaft journalled in intermediate portions of the uprights, a second conveyor frame having its lower end attached to the front part of the platform, said second frame extending upwardly and rearwardly, brace means connecting the upper portion of the second frame to the rear end of the platform, an endless conveyor in the second frame passing over the second shaft, said second shaft being arranged under the first shaft, supporting means for the front end of the conveyor in the first frame and supporting means for the rear end of the conveyor member in the second frame.

In testimony whereof I affix my signature.

GARRETT LAMBERT.